(12) United States Patent
Griessbaum et al.

(10) Patent No.: US 12,190,719 B2
(45) Date of Patent: Jan. 7, 2025

(54) SENSOR DEVICE AND EXPANSION MODULE

(71) Applicant: VEGA Grieshaber KG, Wolfach (DE)

(72) Inventors: Karl Griessbaum, Muehlenbach (DE); Roland Welle, Hausach (DE)

(73) Assignee: VEGA Grieshaber KG, Wolfach (DE)

( * ) Notice: Subject to any disclaimer, the term of this patent is extended or adjusted under 35 U.S.C. 154(b) by 197 days.

(21) Appl. No.: 17/787,502

(22) PCT Filed: Dec. 20, 2019

(86) PCT No.: PCT/EP2019/086707
§ 371 (c)(1),
(2) Date: Jun. 20, 2022

(87) PCT Pub. No.: WO2021/121626
PCT Pub. Date: Jun. 24, 2021

(65) Prior Publication Data
US 2023/0024136 A1    Jan. 26, 2023

(51) Int. Cl.
G08C 19/00 (2006.01)
G01D 21/02 (2006.01)
G05B 19/042 (2006.01)

(52) U.S. Cl.
CPC .............. *G08C 19/00* (2013.01); *G01D 21/02* (2013.01); *G05B 19/0428* (2013.01); *G05B 2219/50193* (2013.01)

(58) Field of Classification Search
CPC ........ G01D 21/00; G01D 21/02; G08C 19/00; G05B 19/0428; G05B 2219/25428; G05B 2219/50193
See application file for complete search history.

(56) References Cited

U.S. PATENT DOCUMENTS 7,005,778 B2   2/2006  Pistor
7,150,639 B2  12/2006  Fehrenbach et al.
(Continued)

FOREIGN PATENT DOCUMENTS

CN   101128146 A    2/2008
DE   101 03 952 A1  10/2002
(Continued)

OTHER PUBLICATIONS

International Preliminary Report on Patentability and Written Opinion issued Jun. 30, 2022 in PCT/EP2019/086707, 9 pages.
(Continued)

*Primary Examiner* — Andre J Allen
(74) *Attorney, Agent, or Firm* — Oblon, McClelland, Maier & Neustadt, L.L.P.

(57) ABSTRACT

A sensor device for process variable determination in an industrial environment, comprising a sensor base and a first expansion module. The sensor base includes circuitry that determines the process variable, a first mechanical interface for mechanically accommodating a first expansion module and a first communication interface to the first expansion module for transmitting measurement and/or control data. In this case, the first expansion module has a second mechanical interface to the sensor base, a third mechanical interface for mechanically accommodating a second expansion module, a second communication interface to the sensor base for transmitting measurement and/or control data, and a third communication interface to the second expansion module for transmitting measurement and/or control data.

17 Claims, 5 Drawing Sheets

(56) References Cited

U.S. PATENT DOCUMENTS

| | | | |
|---|---|---|---|
| 8,531,047 | B2 | 9/2013 | Schmidt et al. |
| 9,674,323 | B1 | 6/2017 | Yu et al. |
| 10,302,501 | B2 | 5/2019 | Lysen et al. |
| 10,352,972 | B1* | 7/2019 | Nayak .................. G08B 5/36 |
| 10,436,916 | B2 | 10/2019 | Freiburger et al. |
| 2005/0035600 | A1 | 2/2005 | Albsmeier et al. |
| 2008/0211664 | A1 | 9/2008 | Griech et al. |
| 2014/0208876 | A1* | 7/2014 | Mattingly .............. G01D 11/30 29/25.35 |
| 2014/0278257 | A1* | 9/2014 | Vandervalk ............ G01D 21/00 702/189 |
| 2014/0336988 | A1 | 11/2014 | Welle et al. |
| 2016/0123861 | A1 | 5/2016 | Scheibelmasser et al. |
| 2016/0305797 | A1* | 10/2016 | Pietrasik ................ H04W 4/80 |
| 2017/0181223 | A1 | 6/2017 | Sur et al. |
| 2017/0316683 | A1 | 11/2017 | Pietrasik et al. |
| 2018/0203135 | A1 | 7/2018 | Freiburger et al. |
| 2019/0195717 | A1 | 6/2019 | Jagiella |
| 2019/0250019 | A1 | 8/2019 | Allgaier et al. |
| 2021/0318159 | A1 | 10/2021 | Dieterle et al. |
| 2024/0077843 | A1* | 3/2024 | Fernandes Lima .. G05B 19/042 |

FOREIGN PATENT DOCUMENTS

| | | | | |
|---|---|---|---|---|
| DE | 101 25 059 | A1 | 12/2002 | |
| DE | 202005015791 | U1 * | 1/2006 | .......... F15B 13/0853 |
| DE | 10 2007 030 055 | A1 | 1/2009 | |
| DE | 10 2009 028 794 | A1 | 2/2011 | |
| DE | 202012100385 | U1 * | 3/2013 | ............ G06F 1/185 |
| DE | 10 2014 108 527 | A1 | 12/2015 | |
| DE | 10 2014 217 706 | A1 | 3/2016 | |
| DE | 10 2015 112 536 | A1 | 2/2017 | |
| DE | 10 2016 212 264 | A1 | 1/2018 | |
| DE | 3 349 047 | A1 | 7/2018 | |
| DE | 10 2017 123 821 | A1 | 4/2019 | |
| EP | 2 803 956 | A1 | 11/2014 | |
| EP | 3 015 847 | A1 | 5/2016 | |
| EP | 3 605 031 | A1 | 2/2020 | |
| WO | WO 2004/017026 | A1 | 2/2004 | |
| WO | WO 2005/103851 | A1 | 11/2005 | |
| WO | WO 2016/131025 | A1 | 8/2016 | |
| WO | WO 2017/103887 | A1 | 6/2017 | |

OTHER PUBLICATIONS

European Office Action issued on Jun. 19, 2023 in European Patent Application No. 19 835 405.2, 7 pages.
German Office Action issued Oct. 7, 2020 in German Patent Application No. 10 2019 220 448.1, 9 pages.
German Office Action issued Sep. 1, 2020 in German Patent Application No. 10 2019 220 432.5, 4 pages.
International Search Report and Written Opinion issued Sep. 15, 2020 in PCT/EP2019/086707 (with English translation), 24 pages.
International Search Report and Written Opinion issued Sep. 11, 2020 in PCT/EP2019/086736 (with English translation), 24 pages.
International Search Report issued Sep. 15, 2020, in PCT/EP2019/086707, filed Dec. 20, 2019, 3 pages.
Combined Chinese Office Action and Search Report issued Feb. 23, 2024 in Chinese Patent Application No. 201980103450.4, 7 pages.

* cited by examiner

SENSOR DEVICE AND EXPANSION MODULE

FIELD OF INVENTION

The invention relates to a sensor device for process variable determination in an industrial environment, an expansion module for a sensor device, and the use of the expansion module for a sensor device.

BACKGROUND OF THE INVENTION

Sensors, such as level meters, record process variables that are transmitted, for example, via a field bus or wirelessly to a server or in a data network. A power cable connected to the sensor is used to provide energy. Alternatively, they contain a battery so that the sensor can operate autonomously. As a rule, however, there is no display and operating unit on the sensor. However, some sensors have the option of retrofitting such a display and control unit. The power supply required for this unit as well as the data exchange with the sensor is then carried out, for example, by means of a wire interface between the sensor and the display and control unit. Further subsequent functional units could conditionally be accommodated in the sensor or in the display and control unit, but this would entail a modification of the existing sensor or a special design of the display and control unit. It may also not be possible to subsequently integrate functional units into an existing sensor or the display and control unit for reasons of space or for other reasons.

SUMMARY OF THE INVENTION

Object of the invention is to provide a solution to make additional functions available to a sensor in a customer-specific configuration in a cost-efficient manner and with little effort.

The object is solved by the objects of the independent patent claims. Advantageous embodiments are the subject of the dependent claims, the following description, and the figures.

According to a first aspect, a sensor device for process variable determination in an industrial environment is provided. The sensor device comprises a sensor base unit and a first expansion module. The sensor base unit comprises a process variable determination unit for determining the process variable, a first mechanical interface for mechanically receiving a first extension module and a first communication interface to the first extension module for transmitting measurement and/or control data. The first extension module has a second mechanical interface to the sensor base unit and a third mechanical interface for mechanically receiving a second extension module, a second communication interface to the sensor base unit for transmitting measurement and/or control data, and a third communication interface to the second extension module for transmitting measurement and/or control data.

The term "process automation in the industrial environment" can be understood as a subfield of technology that includes all measures for the operation of machines and plants without the involvement of humans. One goal of process automation is to automate the interaction of individual components of a plant in the chemical, food, pharmaceutical, petroleum, paper, cement, shipping or mining industries. A wide range of sensors can be used for this purpose, which are adapted in particular to the specific requirements of the process industry, such as mechanical stability, insensitivity to contamination, extreme temperatures and extreme pressures. Measured values from these sensors are usually transmitted to a control room, where process parameters such as level, limit level, flow rate, pressure or density can be monitored and settings for the entire plant can be changed manually or automatically.

One subarea of process automation in the industrial environment concerns logistics automation. In the field of logistics automation, distance and angle sensors are used to automate processes within a building or within an individual logistics facility. Typical applications include systems for logistics automation in the area of baggage and freight handling at airports, in the area of traffic monitoring (toll systems), in retail, parcel distribution or also in the area of building security (access control). Common to the examples listed above is that presence detection in combination with precise measurement of the size and location of an object is required by the respective application side. Sensors based on optical measurement methods using lasers, LEDs, 2D cameras or 3D cameras that measure distances according to the time-of-flight (ToF) principle can be used for this purpose.

Another sub-area of process automation in the industrial environment concerns factory/production automation. Use cases for this can be found in a wide variety of industries such as automotive manufacturing, food production, the pharmaceutical industry or generally in the field of packaging. The goal of factory automation is to automate the production of goods by machines, production lines and/or robots, i.e. to let it run without the involvement of humans. The sensors used in this process and the specific requirements with regard to measuring accuracy when detecting the position and size of an object are comparable to those in the previous example of logistics automation.

"Sensor" is understood to mean a device which has a measuring sensor, in particular in a housing, for determining the process variables, as well as the components, such as electronic components, connections and mechanical elements, which may be present inside the housing.

The sensor device of the first aspect includes such a sensor as a sensor base unit, and a first extension module having a mechanical interface and a communication interface or data interfaces to the sensor base unit, and a mechanical interface and a data interface to a second extension module. The mechanical interface allows the first expansion module to be attached to the sensor base unit. When attached, measurement data and control data, for example, can be exchanged between the sensor base unit and the expansion module via the data interface, referred to herein as the "second communication interface". Both the measurement data and the control data can be transmitted in digital or analog form. The first extension module has a further interface, referred to here as the "third mechanical interface" and "third communication interface", with which a second extension module can be connected to the first extension module mechanically and in terms of data exchange.

For example, the second and third interfaces may be arranged such that the second expansion module is placed on top of the first. According to one embodiment, the first expansion module is attached to one side of the sensor base unit and is arranged to receive the second expansion module as a final expansion module or forming a stack of other expansion modules. For example, the first extension module is attached to the top of the sensor base unit and the second extension module is attached to the top of the first extension module, building up a stack of extension modules extending perpendicular to the surface of the sensor base unit. In this case, the communication interfaces of the first extension module are on opposite sides, e.g., top and bottom. If the extension modules are cylindrical, stacking the extension modules creates a cylindrical stack with a round cross-sectional area, in which the total height results from the height of the individual extension modules. The individual extension modules can have the same or different heights.

A final expansion module does not necessarily have to have two mechanical or communication interfaces. For example, if the final expansion module is a display and operating unit, another expansion module would possibly hinder or prevent the reading of the display or the operation of the sensor device.

According to another embodiment, the first mechanical interface comprises a thread or a snap-on device. The thread may be, for example, an internal or external thread of the housing, or a central screw thread. The second mechanical interface, i.e. the mechanical interface of the first expansion module to be received on the sensor base unit, is the counterpart of the first mechanical interface of the sensor base unit and is thus configured accordingly. The same applies to the mechanical interfaces for attaching the second expansion module to the first expansion module.

According to a further embodiment, the first communication interface is designed optically, e.g. by means of an optocoupler, electrically via a wire connection, electromagnetically, i.e. wirelessly, or inductively, e.g. by means of NFC (near field communication). The communication via the communication interfaces can take place unidirectionally in one of the two directions or bidirectionally. For example, the second extension module requests data from the first extension module. The first extension module forwards the request to the sensor base unit and then receives measurement data, which the first extension module in turn forwards to the requesting second extension module.

According to a further embodiment, the sensor base unit further comprises a first electrical interface to the first expansion module for providing power. The first expansion module further comprises a second electrical interface to the base unit for providing power and a third electrical interface to the second expansion module for providing power. In one embodiment, providing energy may include receiving energy. It may also be provided to exclusively receive energy at the interfaces of the expansion modules.

According to another embodiment, the electrical interface is inductive or wired, and receives power from or delivers power to the first expansion module.

For example, power may be provided to the first expansion module from the second expansion module, and from the first to the sensor base unit. Alternatively, a middle expansion module of an expansion module stack may provide energy to the other expansion modules. For example, the extension module may include an energy buffer that receives and stores energy from the sensor base unit for a period of time until sufficient energy is available to send a radio packet.

According to another embodiment, the first expansion module is arranged to provide power to the sensor base unit as a wired power connection module, i.e., via a cable that can be connected to an external DC or AC power source, or as a battery module.

According to an embodiment, the sensor device has a topmost extension module of a stack of extension modules as a final module a photovoltaic unit, an operating device and/or a display device. That is, the first extension module is considered as the "lowest" extension module on which n further extension modules are stacked, where n=1 ... N, so that the N+1th extension module is the last module, i.e. the top module of the stack. This final module may be such that no further extension modules can be stacked on top of this module. For example, this may be the case for a module that includes an operating device and/or a display device or a photovoltaic unit with photocells.

According to an embodiment, the first expansion module is set up to receive a contactless sensor module as an expansion adapter. Thus, an existing expansion module that operates contactlessly can simply be inserted into the expansion adapter, for example. By means of an expansion adapter, the contactless sensor module can thus also be used if the sensor base unit does not have any contactless interfaces.

According to an embodiment, the first expansion module has a data memory and/or a communication unit for an external communication link. Measured values can thus first be recorded and collected in the data memory and then transmitted to a network or a smartphone via the communication link. The data memory and the communication unit can here be accommodated on independent expansion modules or on a common expansion module. The external communication can, for example, be according to one or more of the standards WLAN, Bluetooth, Zigbee, NB-IOT, GSM, CAT-M, LoRa, Sigfox or other protocols for data transmission. The communication unit can also support a wired connection, e.g. a fieldbus connection, and the expansion module can provide the corresponding hardware and software, such as also a corresponding connector or other connection.

According to an embodiment, the first extension module has an acceleration sensor, a pressure sensor, a geomagnetic field sensor, a gas sensor, a distance sensor, a brightness sensor and/or a temperature sensor. Distance sensors such as lidar, radar and ultrasound as well as motion sensors and brightness sensors are particularly suitable for use in the final expansion modules.

According to an embodiment, a stack of expansion modules has a lid. The lid is attached to the sensor base unit and thus covers all expansion modules. For example, the cover may be attached to the sensor base unit via a thread or a snap-on device and may comprise a sealing device, such as a sealing ring. Alternatively, the mechanical interfaces of the extension modules of a stack of extension modules have a sealing device. For example, mechanically and in terms of material, they are designed to be waterproof, dustproof, and/or airtight. The expansion modules can also have a housing with the corresponding mechanical interfaces.

According to an embodiment, the process variable determination unit is set up to determine a pressure, a filling level, a limit level or a density.

According to a second aspect, an expansion module having the above-described features is provided for the described sensor device.

According to a third aspect, the expansion module is used for a sensor device as described above.

Other options correspond to and result from the embodiments described above.

Thus, a sensor device for process variable determination with a sensor base unit and a process variable determination unit is provided, whereby the sensor device is modularly expandable by several stackable expansion modules.

Other variations of the disclosed embodiments may be understood and carried out by those skilled in the art in carrying out the claimed invention by studying the drawings, the disclosure, and the appended claims. In the claims, the word "comprising" does not exclude other elements or steps, and the indefinite article "a" or "an" does not exclude a plurality. The mere fact that certain measures are recited in interdependent claims does not mean that a combination of those measures cannot be advantageously used. Reference signs in the claims should not be construed to limit the scope of the claims.

BRIEF DESCRIPTION OF THE FIGURES

In the following, embodiments of the invention are described in detail with reference to the accompanying figures. Neither the description nor the figures are to be construed as limiting the invention. Here shows FIG. 1 a diagram of a sensor base unit and a display and control unit, FIG. 2 a diagram of a sensor base unit with display and control unit inserted, FIG. 3 a diagram of a sensor device with an expansion module for stand-alone operation, FIG. 4 different embodiments of expansion modules, FIG. 5 a diagram of a sensor device with two expansion modules, FIG. 6 an arrangement with a base sensor, intermediate modules and a finalization module, FIG. 7 another diagram of a sensor device with sealing rings, FIG. 8 a generic block diagram of a sensor device with an expansion module.

The drawings are merely schematic and not to scale. In principle, identical or similar parts are given the same reference signs.

DETAILED DESCRIPTION OF THE FIGURES

Figure 1:
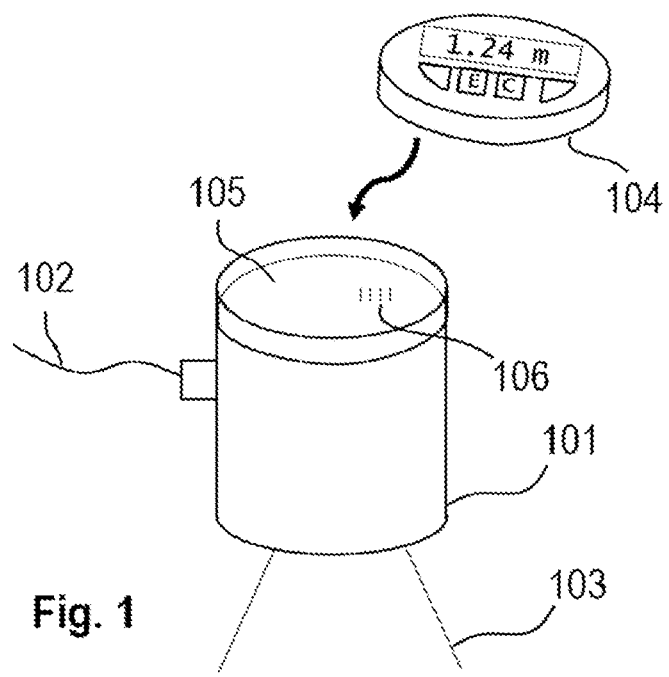

FIG. 1 shows a sensor or a sensor base unit 101, which is supplied with power via a fieldbus interface 102. With the aid of a measured value determination unit 103, the sensor base unit 101 determines a process-relevant measured variable, for example a pressure, a filling level, a limit level or also a density. The measured value is then transmitted in analog form, for example via a 4 . . . 20 mA interface, and/or in digital form via the fieldbus interface 102 to the outside. An on-site display of the determined measured value or also an on-site operation of the sensor 101 is initially not provided in the basic configuration of a sensor unit 101.

If a customer wishes a display and adjustment possibility directly at the sensor, he can subsequently order a display and adjustment module 104, and after delivery insert it independently into the opening 105 of the sensor provided for this purpose. The sensor 101 has sliding contacts 106 in the form of wires in its extension opening 105, which are set up to exchange energy and/or data with extension electronics inserted in the opening 105.

Figure 2:
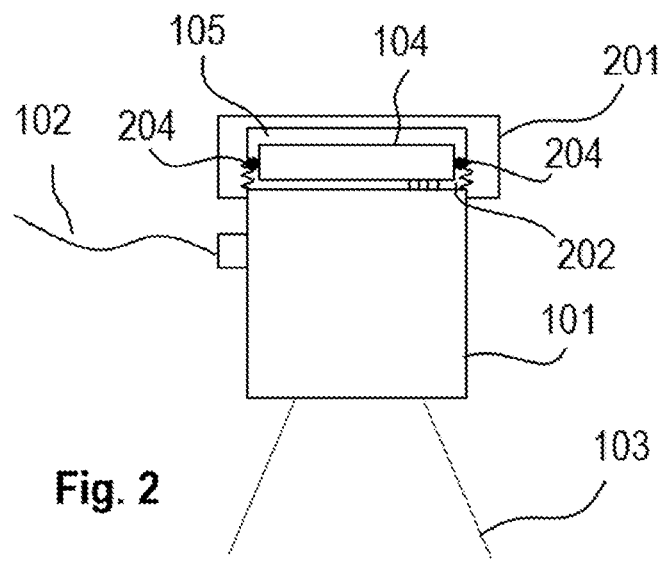

FIG. 2 shows the sensor base unit 101 with expansion electronics inserted in the form of an expansion module 104, for example the aforementioned display and control module 104. After an expansion module 104 has been inserted into the opening 105, the sensor 101 is hermetically sealed by screwing on a cover 201. Specially attached sealing rings 204 in the area 202 between the cover and the sensor housing can ensure that no moisture or dust can penetrate into the interior of the sensor during the subsequent operating phase.

Figure 3:
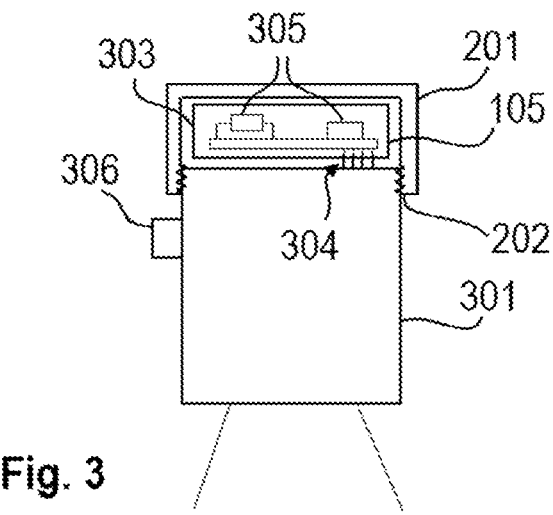

FIG. 3 shows an example in which autonomous operation of sensors is enabled. With respect to its expansion interface 304, the sensor 301 is configured to use a flow of energy flowing in via the interface 304 to power its own electronic components, depending on the expansion module connected. To this end, a power module 303 equipped with batteries 305 is inserted into the expansion bay 105, which can supply power to the sensor 301 via the interface 304. Thus, the insertion of wired supply power via the fieldbus interface 306 can be omitted. The formerly wired sensor 101 can thus be easily converted to a self-sufficient measuring sensor.

Figure 4:
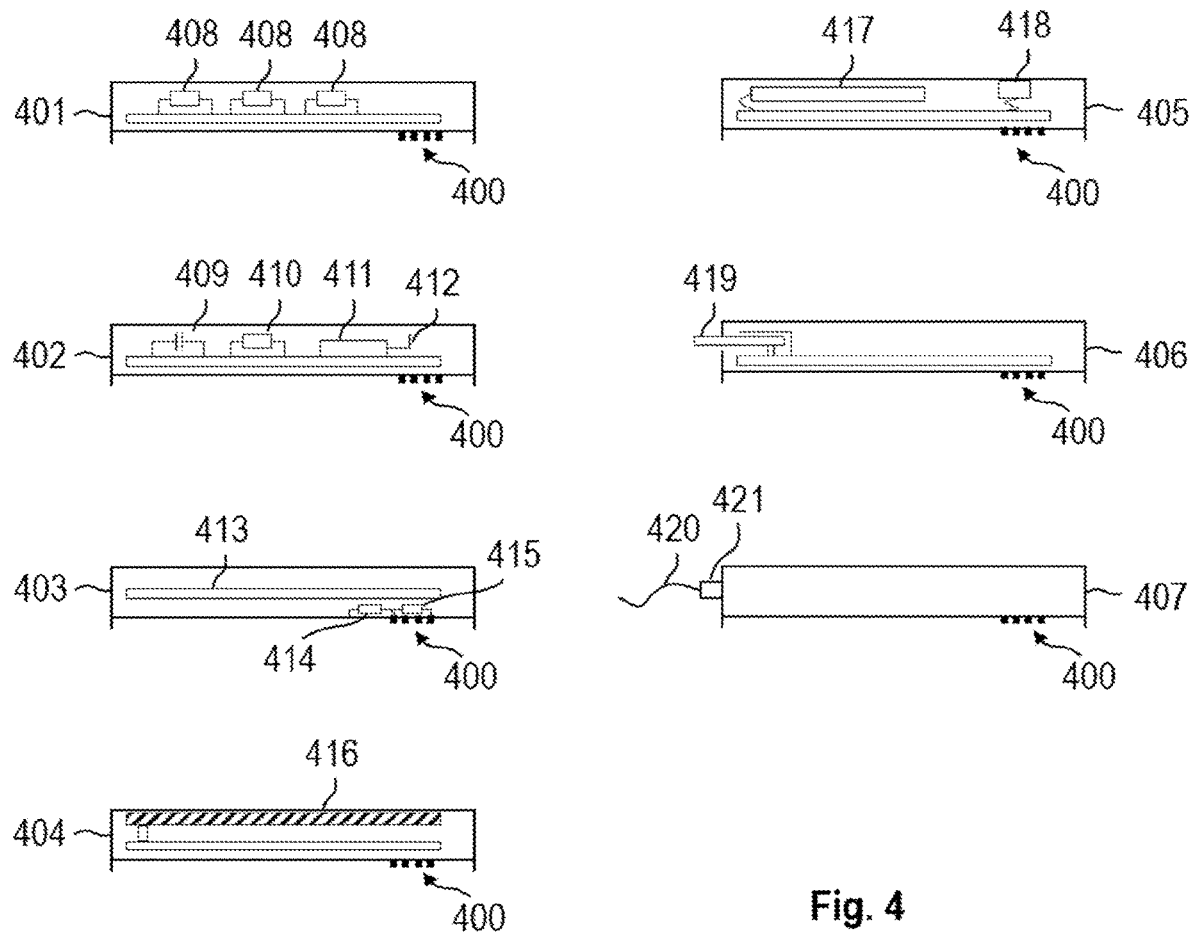

FIG. 4 shows different embodiments of expansion modules. All the embodiments shown have in common that data and/or energy can be exchanged with a sensor 301 via the sliding contacts 400.

The battery module 401 includes a plurality of energy reservoirs 408, such as batteries or accumulators 408, which are suitable for supplying energy to the sensor 301 after insertion into the expansion bay 105 thereof.

The wireless communication module 402 has at least one wireless communication chip 411 and an antenna 412, which exchange measurement values and/or control commands in wireless form with an external location, for example a radio mast or a smartphone. Various prior art wireless communication standards can be used for this purpose, for example WLAN, Bluetooth, Zigbee, NB-IOT, GSM, CAT-M, LoRa, Sigfox or even other known standards. Depending on the power requirements for such communication, it may be provided to equip the module 402 with additional power reservoirs 410. Provision may also be made to initially draw energy from the sensor base unit 301 during the operational phase, and accumulate it in an energy reservoir 409 until sufficient energy is available to send a radio packet.

The expansion adapter 403 enables contactless operating expansion modules 413, such as can be used with stand-alone level sensors, to be used on sensors with wired expansion interfaces 304. For this purpose, the expansion adapter 403 comprises a wirelessly operating power transmission interface 414, for example an induction coil, and a wirelessly operating communication interface 415, for example an NFC interface.

The photovoltaic module 404, after insertion into the expansion bay 105 of a sensor 301, can be used to increase the measurement repetition rate of wired sensors by additionally introducing energy from a solar cell 416, or it can be used to provide the entire supply power of a sensor 301. In the latter case, a sensor 101 that was originally wired is advanced to a sensor 301 that operates autonomously.

In addition to a display 417, the display and control module 405 has an input unit 418, for example a pushbutton 418, and, after insertion into a sensor 301, enables on-site operation directly at the measuring point without the addition of further control elements such as a smartphone or PC.

The service module 406 can be used for long-term diagnostics for problematic measurement points. It includes a long-term data storage device 419, such as an SD card 419, that is used to record diagnostic data provided by the sensor 301 over extended periods of time. The data can subsequently facilitate diagnosis and troubleshooting by trained service personnel.

Finally, the cable module 407 or power connection module 407 can be used whenever a sensor base unit 301 is to be subsequently supplied with additional power by wire after all, or whenever faster, wire communication interfaces are to be added. For this purpose, the cable module 407 provides at least one interface 421 for connecting a cable 420 that can transmit additional power to the sensor base unit 301 and/or can read information from the sensor base unit 301 or introduce information into it from the outside, such as measured values or a software update. Provision may be made to implement additional wired fieldbus standards in the cable module 407 by incorporating hardware and software components, thus making the sensor upgradeable to future standards.

Furthermore (without figure) it can be intended to equip extension modules with additional sensors to extend the application possibilities of a sensor. It may be intended to integrate sensors selected from the group of acceleration sensors, pressure sensors, temperature sensors, geomagnetic field sensors, gas sensors or other sensors in the intermediate and/or finalization modules. In the finalization modules, it is also possible to integrate sensors such as distance sensors, e.g. lidar, radar, ultrasound, motion sensors, brightness sensors or other sensors.

Figure 5:
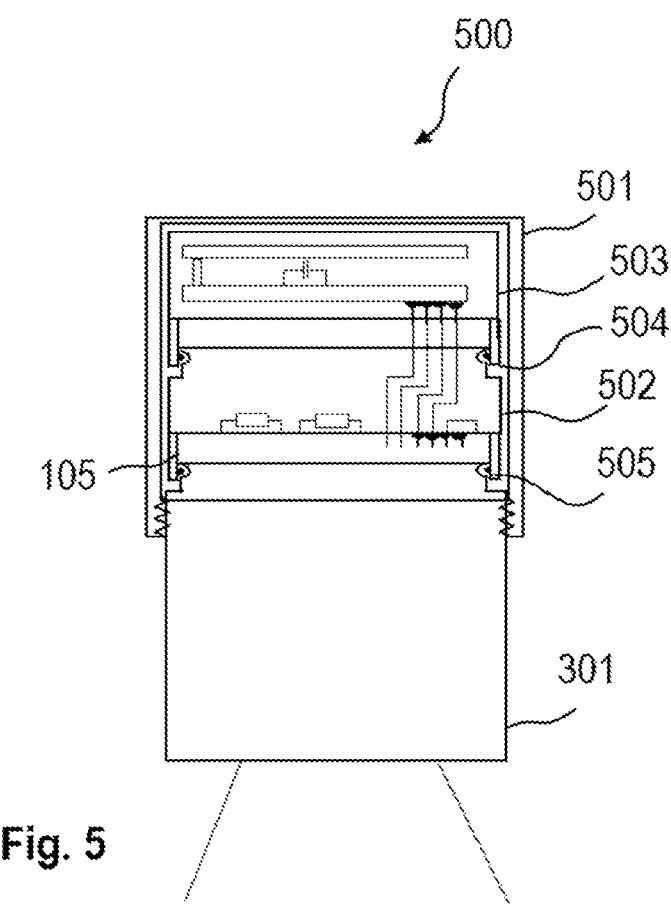

FIG. 5 shows a further development according to the invention for the design of the extension modules 401, 402, 403, 406, 407. The sensor base unit 301 is mechanically designed in the area of its extension shaft 105 in such a way that it enables a mechanical fixation of an extension module, for example with a snap-in mechanism 504, 505 or also a threaded receptacle or other known designs for the fixation of two components. The extension module 502 has the same fixing contour 504 on its upper side as the base sensor 301, and furthermore also provides the interface 505 on its upper side, which is functionally identical to the contacting point 304. According to the invention, the combination of these two features allows the system to be expanded with further expansion modules, which are arranged quasi stacked on top of each other, for example with a module 503. It is obvious that not all modules 401 to 407 are suitable for all positions in a stack. However, all modules which do not have to be freely accessible on their upper side can be used as intermediate modules 502, i.e. in particular the battery module 401, the radio module 402, the expansion adapter 403, the service module 406 and the cable module 407. In particular, the photovoltaic module 404 and the display and control module 405 can be formed as the finalization module 503. However, in principle any expansion module can also be designed as a finalization module.

The sensor base unit 301 supplemented with several modules 402, 503 is closed by a cover 501 with a correspondingly high design, which closes the complete arrangement from the outside and thus protects it from dust and moisture.

Figure 6:
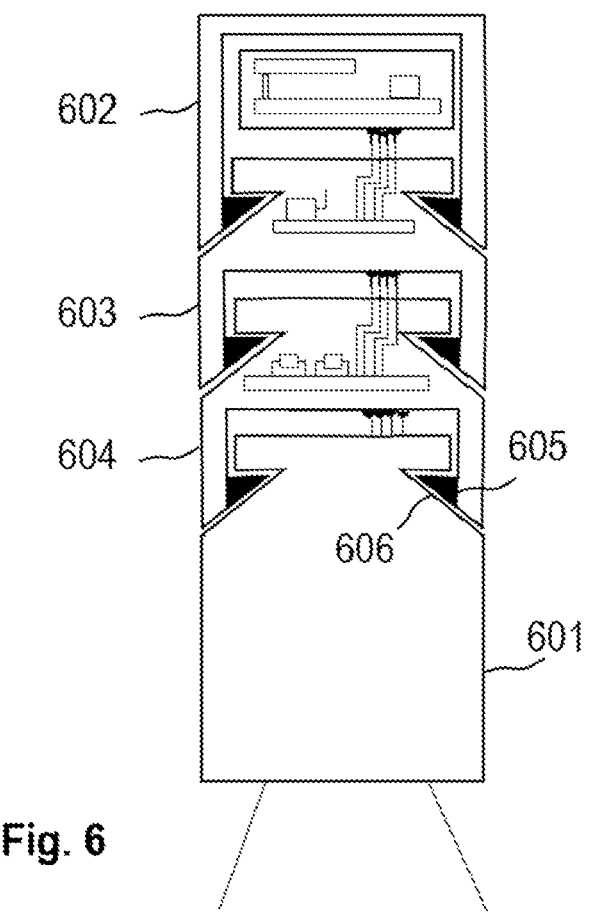

FIG. 6 shows another further development of a sensor device according to the invention with the sensor base unit 601, intermediate modules 603, 604 and finalization module 602. The intermediate modules 603, 604 are designed according to the invention to directly supplement and continue the housing of the sensor 601 by means of mechanical design and choice of material on their respective outer surface. The finalization module 602 is designed to supplement the housing of the sensor both on its outer surface and on its upper surface by mechanical design and choice of material, and thus to complete it completely. Compared to FIG. 5, a cover, the size of which depends on the number of supplemented modules 502, 503, can be dispensed with. Exemplary, but by no means exclusive, in the example of FIG. 6 a snap mechanism 605, 606 is provided to ensure the mechanical stability of the complete arrangement.

Figure 7:
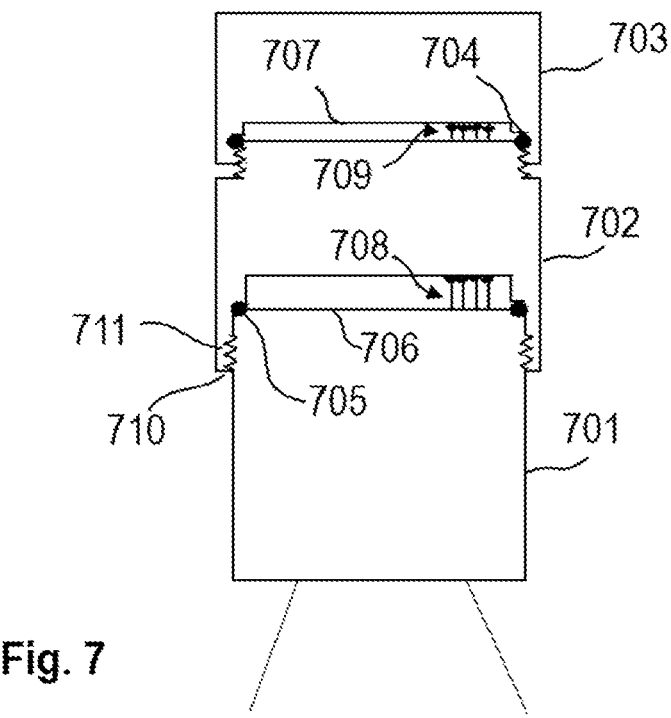

FIG. 7 shows a further embodiment of the sensor device. The intermediate module 702 and the finalization module 703 are designed to separate the cavity 706, 707 in the area of the contacts 708, 709 hermetically from the ambient atmosphere by means of circumferential sealing rings 704, 705. This design can enable safe operation of the complete arrangement, particularly in potentially explosive atmospheres. By way of example, but by no means to the exclusion of all others, a circumferential thread 710, 711 is provided in the example of FIG. 7 to ensure the mechanical stability of the complete arrangement.

Figure 8:
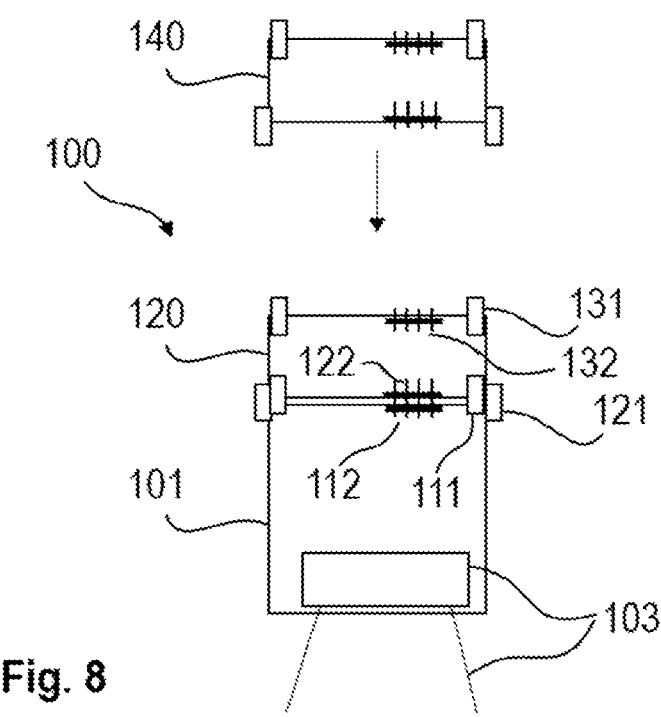

FIG. 8 summarizes a generic block diagram of a sensor device (100) for process variable determination in an industrial environment with a sensor base unit (101) and an expansion module (120).

The sensor base unit (101) has the following components:

A process variable determination unit (103) for determining the process variable, a first mechanical interface (111) for mechanically receiving a first expansion module (120) and a first communication interface (112) to the first expansion module (120) for transmitting measurement and/or control data. In this case, the first expansion module (120) has a second mechanical interface (121) to the sensor base unit (101), a third mechanical interface (131) for mechanically accommodating a second expansion module, a second communication interface (122) to the sensor base unit (101) for transmitting measurement and/or control data, and a third communication interface (132) to the second expansion module for transmitting measurement and/or control data.

This means that several expansion modules can be used on site if required.

Furthermore, it is possible to supply the sensor base unit and expansion modules with power coming from an expansion module.

The invention claimed is:

1. A sensor device for process variable determination in an industrial environment, comprising:
 a sensor base and a first expansion module, the sensor base including:
 processing circuitry configured to determine the process variable,
 a first mechanical interface that mechanically receives the first expansion module, and
 a first communication interface that interfaces to the first expansion module and that transmits measurement and/or control data,
 wherein the first expansion module includes:
 a second mechanical interface that interfaces to the sensor base,
 a third mechanical interface that mechanically receives a second expansion module,
 a second communication interface that interfaces to the sensor base and that transmits measurement and/or control data, and
 a third communication interface that interfaces to the second expansion module and that transmits measurement and/or control data.

2. The sensor device according to claim 1, wherein the first expansion module is attached to a side of the sensor base and is configured to receive the second expansion module as a final expansion module or a stack of further expansion modules.

3. The sensor device according to claim 1, wherein the first mechanical interface includes a thread.

4. The sensor device according to claim 1, wherein the first communication interface is optical, electrical, electromagnetic or inductive.

5. The sensor device according to claim 1, wherein
 the sensor base further includes a first electrical interface that interfaces to the first expansion module for providing power, and
 wherein the first expansion module further includes:
 a second electrical interface that interfaces to the first expansion module for providing power, and a third electrical interface that interfaces to the second expansion module for providing power.

6. The sensor device according to claim 5, wherein the first electrical interface is inductive or wired, and receives power from the first expansion module.

7. The sensor device according to claim 1, wherein the first expansion module is arranged to provide power to the sensor base as a wired power connection module.

8. The sensor device according to claim 1, comprising a topmost extension module of a stack of extension modules as a final module a photovoltaic sensor, an operating device and/or a display device.

9. The sensor device according to claim 1, wherein the first expansion module is configured to receive, as an expansion adapter, a contactless sensor module.

10. The sensor device according to claim 1, wherein the first expansion module includes a data memory and/or a communication circuit operating as an external communication link.

11. The sensor device according to claim 1, wherein the first expansion module includes an acceleration sensor, a pressure sensor, a geomagnetic field sensor, a gas sensor, a distance sensor, a brightness sensor and/or a temperature sensor.

12. The sensor device according to claim 1, wherein a stack of expansion modules includes a cover.

13. The sensor device according to claim 1, wherein the processing circuitry is further configured to determine a pressure, a filling level, a limit level or a density.

14. The sensor device according to claim 1, wherein the first expansion module is arranged to provide power to the sensor base as a battery module.

15. The sensor device according to claim 1, wherein the mechanical interfaces of the expansion modules of a stack of expansion modules have a tightness value.

16. The sensor device according to claim 1, wherein the first mechanical interface includes a snap-on device.

17. The sensor device according to claim 5, wherein the first electrical interface is inductive or wired, and delivers power to the first expansion module.

\* \* \* \* \*